United States Patent [19]

Kitamura et al.

[11] Patent Number: 5,360,857
[45] Date of Patent: Nov. 1, 1994

[54] POLYMER SCALE PREVENTIVE AGENT FROM NAPHTHOQUINONE DYE

[75] Inventors: Hajime Kitamura, Ichihara; Susumu Ueno, Hazaki; Mikio Watanabe, Kamisu; Masahiro Usuki, Kamisu; Toshihiko Nakano, Kamisu, all of Japan

[73] Assignee: Shin-Etsu Chemical Co., Ltd., Tokyo, Japan

[21] Appl. No.: 32,692

[22] Filed: Mar. 17, 1993

Related U.S. Application Data

[63] Continuation of Ser. No. 750,619, Aug. 27, 1991, abandoned.

[30] Foreign Application Priority Data

Aug. 28, 1990 [JP] Japan ................. 2-225525
Aug. 28, 1990 [JP] Japan ................. 2-225526
Aug. 28, 1990 [JP] Japan ................. 2-225527

[51] Int. Cl.$^5$ .............................. C08K 5/07
[52] U.S. Cl. ............................ 524/324; 524/358; 524/503
[58] Field of Search ............... 252/180; 524/358, 557, 524/324

[56] References Cited

U.S. PATENT DOCUMENTS 3,669,946  6/1972  Koyanagi ............................. 526/62
4,180,634  12/1979  Koyanagi et al. .
4,758,639  7/1988  Koyanagi et al. .
4,845,174  7/1989  Amano et al. .
4,933,399  6/1990  Shimizu ............................. 526/62

FOREIGN PATENT DOCUMENTS 91965  10/1983  European Pat. Off. .
126991  12/1984  European Pat. Off. .
320227  6/1989  European Pat. Off. .

Primary Examiner—Christopher Henderson
Attorney, Agent, or Firm—Oblon, Spivak, McClelland, Maier & Neustadt

[57] ABSTRACT

A polymer scale preventive agent for use in polymerization of vinyl chloride monomer or a monomer mixture containing vinyl chloride monomer as a major component, comprising:
(A) a naphthoquinone natural dye and
(B) a polyvinyl alcohol with a saponification degree of at least 50 mol %. The polymer scale preventive agent is formed as coating on the inner wall, etc. of a polymerization vessel. Deposition of polymer scale can be always effectively prevented. Polymers with a high whiteness can be produced, and products formed from the polymer have only a small number of fish eyes.

7 Claims, No Drawings

POLYMER SCALE PREVENTIVE AGENT FROM NAPHTHOQUINONE DYE

This application is a continuation of application Ser. No. 07/750,619, filed on Aug. 27, 1991, now abandoned.

BACKGROUND OF THE INVENTION

1. Field of the Invention

The present invention relates to a polymer scale preventive agent, and a polymerization vessel and method for preventing polymer scale deposition for use in polymerization of vinyl chloride or a monomer mixture containing vinyl chloride as a major component.

2. Description of the Prior Art

In processes of preparing polymers by polymerizing a monomer in a polymerization vessel, the problem that polymer deposits on the inner wall surface and so forth in the form of scale, is known. The deposition of the polymer scale on the inner wall results in disadvantages that the yield of the polymer and the cooling capacity of the polymerization vessel are lowered; that the polymer scale may peel and mix into manufactured polymer, thereby impairing the quality thereof; and that removal of such polymer scale is laborious and hence time-consuming. Further, since the polymer scale contains unreacted monomer and operators may be exposed thereto, which may cause physical disorders in the operators.

Heretofore, to prevent polymer scale deposition on the inner wall surface and so forth of a polymerization vessel, methods in which suitable substances are coated on the inner wall surface, etc. as a scale preventive agent, are known. The scale preventive agents include, for example, a dye or pigment (Japanese Patent Publication (KOKOKU) Nos. 45-30835(1970).

In the meantime, recently, in regard to formed or molded products of vinyl chloride polymers, in particular clear sheets and bottles, improvement in quality with respect to properties such as color, fish eye, bulk specific gravity, gelation rate, thermal stability, etc. is increasingly required by the manufacturers thereof. It is therefore expected to develop a scale preventive agent which does not affect adversely the properties of product polymers.

In the case said dye or pigment is used as a scale preventive agent, however, properties of product polymers are adversely affected as exemplified by (i) and (ii) below.

(i) The coating composed of the scale preventive agent may be readily dissolved, and therefore produced polymers may be colored or may have a lowered bulk specific gravity. Coloration of a polymer is desired to be low to such an extent that the lightness L in the Hunter's equation described in JIS Z 8730 (1980) is at least 70.

(ii) Since adhesion of the coating to the inner wall surfaces of a polymerization vessel is weak, the coating may be partly peeled and lost and polymer scale may deposit on the areas where the carting has been lost, causing increase in fish eyes when the product polymer is processed into formed products such as sheets, etc.

SUMMARY OF THE INVENTION

It is an object of the present invention to provide a scale preventive agent, and a polymerization vessel and a method for preventing polymer scale in polymerization of vinyl chloride or a monomer mixture containing vinyl chloride as a major component, which can always effectively prevent polymer scale deposition as well as can produce polymers of high quality with an extremely reduced color and a very small number of fish eyes after in formed into sheets or the like.

Thus, the present invention provides a polymer scale preventive agent for use in polymerization of vinyl chloride monomer or a monomer mixture containing vinyl chloride monomer as a major component, comprising:

(A) a naphthoquinone natural dye and
(B) a polyvinyl alcohol with a saponification degree of at least 50 mol %.

The present invention also provides a polymerization vessel which has a coating on its inner wall surfaces, comprising said components (A) and (B).

Further, the present invention provides a method of preventing polymer scale deposition in polymerization of vinyl chloride monomer or a monomer mixture containing vinyl chloride monomer as a major component in a polymerization vessel, which comprises the step of carrying out said polymerization in a polymerization vessel having the coating as stated above on its inner wall surfaces.

According to the present invention, deposition of polymer scale can be always effectively prevented in polymerization or copolymerization of vinyl chloride monomer or a monomer mixture containing vinyl chloride as a major component, and in addition the coating formed using the scale preventive agent of the present invention does not be dissolved or peeled into the polymerization mass. Consequently, the application of the present invention obviates the fear of product polymers being colored, and therefore makes it possible to produce polymers of high quality with a whiteness having an L value of 70 or more, extremely reduced fish eyes after formed or molded and a lowered bulk specific gravity.

Further, according to the present invention, polymer scale deposition can be effectively prevented, independent of the polymerization conditions such as the kind of monomers, type of polymerization, the material constituting the inner wall of polymerization vessels, etc. Particularly in suspension polymerization, even if the polymerization is carried out in any of stainless steel polymerization vessels and glass-lined polymerization vessels, or if a polymerization catalyst with a strong oxidative effect is used, polymer scale deposition can be effectively prevented.

Therefore, the operation of removing polymer scale is not required to be conducted every polymerization run; hence productivity is markedly improved in addition to stable production of polymers of high quality.

DETAILED DESCRIPTION OF PREFERRED EMBODIMENTS

(A) Naphtoquinone Natural Dye

The naphtoquinone natural dye, the component (A) of the scale preventive agent, includes, for example, naphthoquinones such as 6-methyl-1,4-naphthoquinone, 2-methyl-1,4-naphthoquinone, lawsone, juglone and plumbagin; Vitamin Ks such as Vitamin $K_1$ and Vitamin $K_2$; naphthazarins such as naphthazarin, 2,3-dihydroxynaphthazarin, 2-methylnaphthazarin, 2-hydroxynaphthazarin, 2-hydroxy-3-methylnaphthazarin, 2-hydroxy-3-ethylnaphthazarin, 2-hydroxy-3acetylnaphthazarin, 2,7-dimethylnaphthazarin; shikonins such as alkannin, shikonin, acetylshikonins, isobutylshikonins, $\beta,\beta'$-dimethylacrylshikonins, $\beta$-hydroxyisovalerylshikonins, and teracrylshikonins; and derivatives thereof. These can be used singly or in combination of two or more, and the combination is selected suitably.

Among these naphthoquinone natural dyes, preferred are shikonins such as shikonin, acetylshikonins, isobutylshikonins, $\beta,\beta'$-dimethylacrylshikonins, $\beta$-hydroxyisovalerylshikonins and teracrylshikonins, and naphthazarins such as naphthazarin, 2,3-dihydroxynaphthazarin, 2-methylnaphthazarin, 2-hydroxynaphthazarin, 2-hydroxy-3-methylnaphthazarin, 2-hydroxy-3-ethylnaphthazarin, 2-hydroxy-3-acetylnaphthazarin, and 2,7-dimethylnaphthazarin. The shikonins and naphthazarins can be extracted from lithospermum root with an organic solvent.

(B) Polyvinyl Alcohol

The polyvinyl alcohol used as the component (B) has a saponification degree of at least 50 mol %. If the saponification degree of the polyvinyl alcohol is less than 50 mol %, the scale preventing effect of the scale preventive agent is lowered. The saponification degree of the polyvinyl alcohol is preferably 70 mol % or more, more preferably 95 mol % or more, and still more preferably 98 mol % or more, because the scale preventing effect is further improved.

Moreover, in the most preferred embodiment, the component (B) essentially consists of (B-1) a polyvinyl alcohol with a saponification degree of 95 mol % or more, preferably 98 mol % or more, and (B-2) a polyvinyl alcohol with a saponification degree of at least 70 mol % but not more than 95 mol %, preferably from 70 to 93 mol %. The former PVA (B-1) can be substantially regarded as a completely saponified one. The combined use of the components (B-1) and (B-2) achieves further improved scale preventing effect, although the reason therefor has not been clarified yet. The weight ratio of the component (B-1)/the component (B-2) is preferably in the range of 1/50 to 50/1, more preferably 1/10 to 10/1.

The polymerization degree of the polyvinyl alcohol (B) is preferably high, because the coating formed on the inner wall surfaces, etc. of a polymerization vessel has good stability and good resistance to dissolving power possessed by monomers. Normally, polyvinyl alcohols with a polymerization degree of 300 to 8,000 are suitable, and ones with a polymerization degree of 2,000 to 5,000 are desirably used. The amount of the component (B) in the scale preventive agent may be normally 0.1 to 10,000 parts by weight, preferably 1 to 2,000 parts by weight, per 100 parts by weight of the component (A). If the amount of the component (B) is too small or too large relatively to that of the component (A), the improvement in the scale preventing effect due to the combination of these two components may not be obtained.

Other Components

In addition to the components (A) and (B) above, various anionic, cationic or ampholytic hydrophilic polymeric compounds, surface active agents, amine compounds, phenol group-containing compounds, quinone compounds, and so on may be added to the scale preventive agent of the present invention to improve the scale preventing effect.

The scale preventive agent of the present invention is formed as a coating on, e.g., the inner wall surfaces, etc. of a polymerization vessel, thereby preventing the deposition of polymer scale thereon. Normally, where said coating is formed on the inner wall surfaces, etc. of a polymerization vessel, the polymer scale preventive agent is added with a solvent, and used in the form of a solution or dispersion, i.e., a coating liquid.

Preparation of Coating Liquid

The coating liquid above is prepared by adding the components (A) and (B), and optionally other components to a suitable solvent.

The solvent used for preparation of the coating liquid includes, for example, water; alcohols such as methanol, ethanol, propanol, butanol, 2-butanol, 2-methyl-1-propanol, 2-methyl-2-propanol, 3-methyl-1-butanol, 2-methyl-2-butanol, and 2-pentanol; ketones such as acetone, methyl ethyl ketone, and methyl isobutyl ketone; esters such as methyl formate, ethyl formate, methyl acetate, and methyl acetoacetate; ether solvents such as 4-methyl dioxolan and ethylene glycol diethyl ethers; furans such as tetrahydrofuran, furfural, fulfuryl alcohol and tetrahydrofurfuryl alcohol; and aprotic solvents such as dimethylformamide, dimethyl sulfoxide, acetonitrile and the like. These solvents are used singly or as a mixed solvent of two or more as appropriate.

The total concentration of the component (A) and the component (B) is not limited as long as the coating weight described later is attained, but normally from 0.001 to 20% by weight, preferably from 0.005 to 5% by weight.

The pH of the coating liquid is not particularly limited. A pH adjuster may be added if necessary. Such pH adjusters include, for example, sulfuric acid, phosphoric acid, acetic acid, oxalic acid, lactic acid, p-toluenesulfonic acid, phytic acid, thioglycollic acid, glycollic acid, sodium hydroxide, potassium hydroxide, aqueous ammonia, ethylene diamine and the like, which may used suitably.

Formation of the Coating

The polymer scale preventive liquid is applied to the inner walls of a polymerization vessel and then dried sufficiently, followed by washing with water if necessary, to form the coating. The drying may be carried out at a temperature from room temperature to 100° C., for instance.

The coating liquid is preferably applied to not only the inner wall surface of a polymerization vessel but also other parts with which the monomer comes into contact during polymerization to form the coating on such parts. For example, it is preferred to apply the coating liquid to a stirring shaft, stirring blades, baffles, condensers, headers, search coil, bolts, nuts, etc. to form the coating thereon.

More preferably, for formation of the coating, the polymer scale preventive liquid is applied to parts with which monomers does not come into contact during polymerization but on which polymer scale may deposit, for example, parts of a recovery system for unreacted monomer with which unreacted monomer comes into contact, such as inner surfaces, etc., of equipment and pipes of the recovery system. Specifically, such parts include the inner surfaces of monomer distillation columns, condensers, monomer stock tanks and valves.

On the surfaces on which the coating has been thus formed, deposition of polymer scale is prevented.

The method of applying the coating liquid is not particularly limited, and includes, for example, the brush coating, spray coating, the method of filing the polymerization vessel, etc., with the coating liquid followed by withdrawal thereof, and automatic coating methods as disclosed in Japanese Pre-examination Patent Publication (KOKAI) Nos. 57-61001(1982) and 55-36288(1980), and Japanese Patent Publication (KOHYO) Nos. 56-501116(1981) and 56-501117(1981), and Japanese Pre-examination Publication (KOKAI) No. 59-11303(1984), etc.

The method of drying wet coated surfaces provided by application of the polymer scale preventive liquid, is not limited, either. Following methods can be used. That is, a method in which, after the liquid is applied, hot air with an suitable elevated temperature is blown to the coated surface, and a method in which the inner wall surface of a polymerization vessel and the surfaces of other parts to be coated are previously heated to from 30° to 80° C., and the coating liquid is directly applied to the heated inner wall surfaces, etc. After dried, the coated surfaces are washed with water if necessary.

The coating thus obtained normally has a coating weight of preferably 0.001 g/m² or more, and more preferably from 0.05 to 2 g/m² in the dry state.

The coating operation may be conducted every one to ten-odd batches of polymerization. The formed coating has good durability and retains the scale-preventing action; therefore the coating operation is not necessarily performed every batch of polymerization. Thus, productivity is improved.

Polymerization

After the formation of the coating on the inner wall surfaces of a polymerization vessel, and preferably an other parts with which monomer may come into contact during polymerization, polymerization is carried out in accordance with conventional procedures. That is, a monomer, a polymerization initiator, and optionally a polymerization medium such as water, etc., a suspending agent, a solid dispersing agent, a dispersing agent such as nonionic or anionic emulsifying agents are charged into the polymerization vessel, followed by carrying out polymerization according to conventional methods.

The monomer to be polymerized by application of the method of this invention includes vinyl chloride or a monomer mixture of vinyl chloride normally in an amount of 50% by weight or more and a monomer copolymerizable with the vinyl chloride. The monomer copolymerizable with vinyl chloride includes vinyl esters such as vinyl acetate and vinyl propionate; acrylic acid, methacrylic acid, and esters or salts thereof; maleic acid, fumaric acid, and esters or anhydrides thereof; styrenes, acrylonitrile, halogenated vinylidenes, and vinyl ethers. These may be used singly or in combination of two or more.

There are no particular limitations on the type of polymerization to which the method of this invention can be applied. The present invention is effective in any type of polymerization such as suspension polymerization, emulsion polymerization, solution polymerization, bulk polymerization, and gas phase polymerization. Particularly, the present method exhibits especially effective scale preventing effect in the suspension polymerization of polymerization systems containing a partially saponified polyvinyl alcohol and/or a completely saponified polyvinyl alcohol as a dispersing agent.

In the following, a general polymerization method is described with reference to the case of suspension polymerization, for instance, but this is only a typical and non-limitative example.

First, water and a dispersing agent are charged into a polymerization vessel, and thereafter a polymerization initiator is charged. Subsequently, the inside of the polymerization vessel is evacuated to a pressure of from 0.1 to 760 mmHg, and a monomer is then charged (whereupon the pressure inside the polymerization vessel usually becomes from 0.5 to 30 kgf/cm².G). Thereafter, polymerization is carried out at a temperature of from 30° to 80° C. During the polymerization, one or more of water, a dispersing agent and a polymerization initiator may be added, if necessary. The polymerization may be judged to be completed when the pressure inside the polymerization vessel falls to from 0 to 7 kgf/cm².G or when cooling water which passes through a jacket provided around the polymerization vessel indicates almost the same temperature at the inlet where it is charged and at the outlet where it is discharged (i.e., when liberation of heat due to polymerization reaction has subsided). The water, dispersing agent and polymerization initiator to be charged for polymerization are used in amounts of 20 to 500 parts by weight, 0.01 to 30 parts by weight, and 0.01 to 5 parts by weight, respectively, per 100 parts by weight of the monomer.

Application of the method of preventing polymer scale deposition of the present invention to polymerization, makes it possible to prevent polymer scale from depositing, independent of materials constituting the inner wall, etc. of a polymerization vessel. For example, this method can prevent deposition of polymer scale even in the case polymerization is carried out in a polymerization vessel made of a steel including stainless steel or lined with glass.

Any additive materials that have been conventionally added in a polymerization system can be used without any limitation. More specifically, the method of this invention can effectively prevent polymers from depositing, even in polymerization systems containing the following additives: for example, polymerization catalysts such as t-butyl peroxyneodecanoate, bis(2-ethylhexyl) peroxydicarbonate, 3,5,5-trimethylhexanoyl peroxide, α-cumyl peroxyneodecanoate, cumene hydroperoxide, cyclohexanone peroxide, t-butyl peroxypivalate, bis(2-ethylhexyl) peroxydicarbonate, benzoyl peroxide, lauroyl peroxide, 2,4-dichlorobenzoyl peroxide, diisopropyl peroxydicarbonate, α,α'-azobisisobutyronitrile, α,α'-azobis-2,4-dimethylvaleronitrile, potassium peroxodisulfate, ammonium peroxodisulfate, p-menthane hydroperoxide; suspension agents comprised of natural or synthetic polymeric compounds such as partially saponified polyvinyl alcohols, completely saponified polyvinyl alcohols, polyacrylic acids, vinyl acetate/maleic anhydride copolymer, cellulose derivatives such as hydroxypropylmethyl cellulose, and gelatin; solid dispersing agents such as calcium phosphate and hydroxyapatite; nonionic emulsifying agents such as sorbitan monolaurate, sorbitan trioleate and polyoxyethylene alkyl ether; anionic emulsifying agents such as sodium lauryl sulfate, sodium alkylbenzenesulfonates such as sodium dodecylbenzenesulfonate and sodium dioctylsulfosuccinate; fillers such as calcium carbonate and titanium oxide; stabilizers such as tribasic lead sulfate, calcium stearate, dibutyltin dilaurate and dioctyltin mercaptide; lubricants such as rice wax, stearic acid and cetyl alcohol; plasticizers such as DOP and DBP; chain transfer agents such as mercaptans such as t-dodecyl mercaptan, and trichloroethylene.

EXAMPLES

The present invention is now described by way of working examples and comparative examples. In each of the tables below, Experiments marked with * are comparative examples, and the other Experiments working examples of the present invention.

EXAMPLE 1

Completely saponified polyvinyl alcohols (B-1) used in experiments below are given in Table 1, and partially saponified polyvinyl alcohols (B-2) are given in Table 2.

Polymerization was carried out in the following manner using a stainless steel polymerization vessel with an inner capacity of 1,000 liters equipped with a stirrer.

In each experiment, first, a component (A) (naphthoquinone natural dye) and a component (B) (B-1: completely saponified PVA; B-2: partially saponified PVA) were dissolved in a solvent so as to give a total concentration as given in Table 3, and the pH of the solution was measured and if necessary a pH adjuster was added thereto to prepare a coating liquid. The coating liquid was applied to the inner wall and other parts with which monomers come into contact during polymerization, such as the stirring shaft, stirring blades and baffles. Then, the wet coated surfaces were dried by heating at 50° C. for 10 min., followed by washing with water. However, in comparative examples, the coating operation was conducted as follows. In Experiment No. 101, no coating liquid was applied; in Experiment Nos. 102, 103, 124, 125 and 140, a coating liquid containing either a component (A) or a component (B) was applied; in Experiment Nos. 116, 130, 138, 156 and 157, a coating liquid containing a synthetic azine dye (C.I. Acid Black 2) was used in place of a naphthoquinone natural dye (A); and in Experiment No. 139 a coating liquid containing a polyvinyl alcohol with a polymerization degree of 40 mol % was used as the component (B).

In Table 3, in regard to each of the coating liquids used in the experiments, the kinds of the components (A) and (B), the weight ratio of the component (A)/(B-1)/(B-2), the kind of the solvent, the total concentration of the components (A) and (B), the kind of the pH adjuster added and the pH of the coating solution are given.

Subsequently, in the polymerization vessel in which the coating had been formed by the coating operation as above, were charged 400 kg of water, 200 kg of vinyl chloride, 250 g of a partially saponified polyvinyl alcohol, 25 g of hydroxypropylmethyl cellulose and 75 g of diisopropyl peroxydicarbonate. Then, polymerization was carried out at 57° C. for 6 hours with stirring.

Measurement of the Amount of Polymer Scale Deposition

After the completion of the polymerization, the amount of polymer scale depositing on the inner wall of the polymerization vessel was measured.

Measurement of Whiteness

The whiteness of the polymer obtained in each Experiment was measured according to the following method.

A hundred parts by weight of a polymer, one part by weight of a tin laurate stabilizing agent (tradename: TS-101, product of Akishima Chemical Co.) and 0.5 part by weight of a cadmium stabilizing agent (tradename: C-100J; product of Katsuta Kako Co.), and 50 parts by weight of a plasticizer DOP were kneaded at 160° C. for 5 min. with a twin roll mill, and then formed into a sheet 1 mm thick. Subsequently, this sheet was placed in a mold measuring 4 cm $\times$ 4 cm $\times$ 1.5 cm (thickness), and molded under heating at 160° C. and under a pressure of 65 to 70 kgf/cm$^2$ to prepare a test specimen. This test specimen was measured for lightness L in the Hunter's color difference equation described in JIS Z 8730 (1980). Whiteness was evaluated to become higher with increase in L value.

The L value was determined as follows.

The stimulus value Y of XYZ color system was determined according to the photoelectric tristimulus colorimetry using the standard light C, a photoelectric colorimeter (Color measuring color difference meter Model Z-1001DP, product of Nippon Denshoku Kogyo K.K.) in accordance with JIS Z 8722. As the geometric condition for illumination and receiving of light, the condition d defined in section 4.3.1 of JIS Z 8722 was adopted. Next, L was calculated based on the equation: L=10Y$^{\frac{1}{2}}$ described in JIS Z 8730(1980).

Measurement of Fish Eyes

A polymer produced in each of the experiments was formed into a sheet, and fish eyes were measured according to the method below.

A mixture of 100 parts by weight of a polymer, 50 parts by weight of DOP, 1 part by weight of dibutyltin dilaurate, 1 part by weight of cetyl alcohol, 0.25 parts by weight of titanium oxide and 0.05 parts by weight of carbon black was kneaded at 150° C. for 7 minutes with 6 inch rolls, and was then formed into a sheet with a thickness of 0.2 mm. The number of fish eyes per 100 cm$^2$ on the sheet obtained was measured by the method of transmitting light through the sheet.

The results are given in Table 3.

TABLE 1

| | (B-1: Completely saponified polyvinyl alcohols) | | |
|---|---|---|---|
| No. | Saponification degree (mol %) | Average polymerization degree | Tradename (Manufacturer) |
| Ia | 99.0 ± 0.5 | 4000 | Kuraray Poval PVA-140 (Kuraray Co., Ltd.) |
| Ib | 99.0 or more | 2500 | Shin-Etsu Poval C-25 (Shin-Etsu Chemical Co., Ltd) |
| Ic | 99.0 or more | 2600 | Gosenol NH-26 (Japan Synthetic Rubber Co., Ltd) |
| Id | 99.0 or more | 2000 | Shin-Etsu Poval C-20 (Shin-Etsu Chemical Co., Ltd) |
| Ie | 98.5 ± 0.5 | 1700 | Shin-Etsu Poval C-17 (Shin-Etsu Chemical Co., Ltd) |

TABLE 1-continued

| | (B-1: Completely saponified polyvinyl alcohols) | | |
|---|---|---|---|
| No. | Saponification degree (mol %) | Average polymerization degree | Tradename (Manufacturer) |
| If | 98.5 ± 0.5 | 1000 | Shin-Etsu Poval C-10 (Shin-Etsu Chemical Co., Ltd) |
| Ig | 96.5 ± 1.0 | 1700 | Shin-Etsu Poval Ma-17 (Shin-Etsu Chemical Co., Ltd) |

TABLE 2

| | (B-2: Partially saponified polyvinyl alcohols) | | |
|---|---|---|---|
| No. | Saponification degree (mol %) | Average polymerization degree | Tradename (Manufacturer) |
| IIa | 88 ± 1 | 2400 | Shin-Etsu Poval PA-24 (Shin-Etsu Chemical Co., Ltd) |
| IIb | 88 ± 1 | 2000 | Shin-Etsu Poval PA-20 (Shin-Etsu Chemical Co., Ltd) |
| IIc | 79 ± 1 | 2000 | Gosenol KH-20 (Japan Synthetic Rubber Co., Ltd) |
| IId | 88 ± 1 | 1000 | Shin-Etsu Poval PA-10 (Shin-Etsu Chemical Co., Ltd) |
| IIe | 40 ± 1 | 390 | Gosenol L-5407 (Japan Synthetic Rubber Co., Ltd) |

TABLE 3

| Exp. No. | (A) Naphtoquinone natural coloring matter | (B) Polyvinyl alcohols* | | Weight ratio (A)/(B-1)/(B-2) | Solvent | (A) + (B) total concentration (%) | pH adjuster | pH | Amount of polymer scale (g/m²) | L value | No. of fish-eye |
|---|---|---|---|---|---|---|---|---|---|---|---|
| | | (B-1) Completely saponified polyvinyl alcohols | (B-2) Partially saponified polyvinyl alcohols | | | | | | | | |
| 101* | — | — | — | — | — | — | — | — | 1300 | 73.0 | 40 |
| 102* | 2-hydroxynaphthazarin | Ia, s = 99.0 | — | 100/0/0 | Water/Methanol (90/10) | 0.3 | NaOH | 8.0 | 200 | 70.0 | 35 |
| 103* | — | — | — | 0/100/0 | Water/Methanol (90/10) | 0.3 | NaOH | 8.0 | 1000 | 73.0 | 35 |
| 104 | 2-hydroxynaphthazarin | Ia s = 99.0 | — | 100/10/0 | Water/Methanol (90/10) | 0.3 | NaOH | 8.0 | 0 | 72.5 | 2 |
| 105 | 2-hydroxynaphthazarin | Ia s = 99.0 | — | 100/100/0 | Water/Methanol (90/10) | 0.3 | NaOH | 8.0 | 0 | 72.5 | 3 |
| 106 | 2-hydroxynaphthazarin | Ia s = 99.0 | — | 100/600/0 | Water/Methanol (90/10) | 0.3 | NaOH | 8.0 | 0 | 72.5 | 2 |
| 107 | 2-hydroxynaphthazarin | Ia s = 99.0 | — | 100/100/0 | Water/Methanol (90/10) | 0.3 | NaOH | 8.0 | 0 | 73.0 | 4 |
| 108* | C.I. Acid Black 2 | Ia s = 99.0 | — | 100/100/0 | Water/Methanol (90/10) | 0.01 | NaOH | 8.0 | 70 | 67.0 | 30 |
| 109 | Shikonin | Ib, s ≦ 99.0 | — | 100/100/0 | Water/Methanol (50/50) | 0.3 | KOH | 9.0 | 0 | 72.0 | 3 |
| 110 | Acetylshikonin | Ic, s ≦ 99.0 | — | 100/50/0 | Water/Methanol (50/50) | 0.3 | KOH | 8.5 | 0 | 72.0 | 3 |
| 111 | 2,3-dihydroxynaphthazarin | Id, s ≦ 99.0 | — | 100/200/0 | Water/Methanol (50/50) | 0.3 | KOH | 8.5 | 0 | 72.5 | 3 |
| 112 | Isobutylshikonin | Ie, s ≦ 98.0 | — | 100/300/0 | Water/Methanol (50/50) | 0.3 | KOH | 9.0 | 2 | 72.0 | 5 |
| 113 | 2,7-dimethylnaphthazarin | If, s = 98.5 | — | 100/20/0 | Water/Methanol (50/50) | 0.3 | KOH | 9.0 | 6 | 71.5 | 5 |
| 114 | 2-methylnaphthazarin | Ig, s = 96.5 | — | 100/100/0 | Water/Methanol (50/50) | 0.3 | KOH | 8.5 | 4 | 72.0 | 5 |
| 115 | 2,7-dimethylnaphthazarin | Ig, s = 99.0 | — | 100/300/0 | Water/Methanol (50/50) | 0.3 | KOH | 8.5 | 0 | 72.5 | 2 |
| 116* | C.I. Acid Black 2 | Ia s = 99.0 | — | 100/100/0 | Water/Methanol (50/50) | 0.3 | H₃PO₄ | 5.0 | 2 | 67.5 | 5 |
| 117 | Isobutylshikonin | Ia s = 99.0 | — | 100/0/5 | Water/Methanol (50/50) | 0.3 | H₃PO₄ | 5.0 | 0 | 72.0 | 3 |
| 118 | Naphthazarin | Ia s = 99.0 | — | 100/100/0 | Water/Methanol (50/50) | 0.3 | H₃PO₄ | 6.0 | 2 | 72.5 | 3 |
| 119 | 2-hydroxy-3-methylnaphthazarin | Ic, s ≦ 99.0 | — | 100/100/0 | Water/Methanol (80/20) | 0.3 | NaOH | 8.0 | 0 | 72.5 | 2 |
| 120 | Teracrylic shikonin | Id s ≦ 99.0 | — | 100/50/0 | Water/Ethanol (80/20) | 0.3 | NaOH | 9.0 | 2 | 72.0 | 3 |
| 121 | Naphthazarin | Id s ≦ 99.0 | — | 100/50/0 | Water/Ethanol (80/20) | 0.3 | NH₄OH | 9.0 | 0 | 72.0 | 2 |
| 122 | Shikonin | Ia, s ≦ 99.0 | — | 100/200/0 | Water/Ethanol (80/20) | 0.3 | NH₄OH | 9.5 | 0 | 72.5 | 2 |
| 123 | Acetylshikonin | Id s ≦ 99.0 | — | 100/200/0 | Water/Methanol (50/50) | 0.3 | NH₄OH | 8.0 | 0 | 72.5 | 3 |
| 124* | Naphthazarin | — | — | 100/0/0 | Water/Methanol (50/50) | 0.5 | NaOH | 9.0 | 320 | 71.5 | 35 |
| 125* | — | — | IIa, s = 88 | 0/0/0 | Water/Methanol (50/50) | 0.5 | NaOH | 9.0 | 1100 | 73.0 | 35 |
| 126 | Naphthazarin | — | IIa s = 88 | 100/0/10 | Water/Methanol (50/50) | 0.5 | NaOH | 9.0 | 2 | 72.0 | 3 |
| 127 | Naphthazarin | — | IIa s = 88 | 100/0/100 | Water/Methanol (50/50) | 0.5 | NaOH | 9.0 | 2 | 72.0 | 3 |
| 128 | Naphthazarin | — | IIa s = 88 | 100/0/100 | Water/Methanol (50/50) | 0.5 | KOH | 10.0 | 2 | 72.5 | 4 |
| 129 | Shikonin | — | IIa s = 88 | 100/0/5 | Water/Methanol (50/50) | 0.3 | KOH | 10.0 | 2 | 72.5 | 3 |
| 130* | C.I. Acid Black 2 | — | IIa s = 88 | 100/0/50 | Water/Methanol (50/50) | 0.3 | KOH | 10.0 | 560 | 67.0 | 35 |
| 131 | β-hydroxyisovaleryl shikonin | — | IIa s = 88 | 100/0/5 | Water/Methanol (50/50) | 0.3 | KOH | 8.0 | 2 | 71.5 | 4 |
| 132 | 2,3-dihydroxynaphthazarin | — | IIa s = 88 | 100/0/50 | Water/Methanol (50/50) | 0.3 | KOH | 8.5 | 2 | 71.5 | 4 |
| 133 | 2,7-dimethylnaphthazarin | — | IIc, s = 79 | 100/0/200 | Water/Methanol (50/50) | 0.3 | KOH | 8.5 | 2 | 72.5 | 4 |
| 134 | Shikonin | — | IId, s = 88 | 100/0/50 | Water/Methanol (50/50) | 0.5 | KOH | 8.5 | 8 | 71.5 | 9 |
| 135 | Teracrylic shikonin | — | IId s = 88 | 100/0/10 | Water/Methanol (50/50) | 1.0 | H₂SO₄ | 5.5 | 5 | 71.5 | 7 |
| 136 | 2-methylnaphthazarin | — | IId s = 88 | 100/0/200 | Water/Methanol (50/50) | 0.5 | H₂SO₄ | 4.5 | 6 | 72.0 | 6 |
| 137 | Acetylshikonin | — | IIa s = 88 | 100/0/500 | Water/Methanol (50/50) | 0.5 | H₂SO₄ | 4.0 | 6 | 72.5 | 6 |
| 138* | C.I. Acid Black 2 | — | IIb s = 88 | 100/0/200 | Water/Methanol (50/50) | 0.5 | H₂SO₄ | 6.0 | 10 | 67.5 | 8 |
| 139* | Shikonin | — | IIe, s = 40 | 100/200/1 | Water/Methanol (50/50) | 0.5 | NaOH | 9.0 | 35 | 72.0 | 20 |

| Exp. No. | (A) Naphtoquinone natural coloring matter | (B-1) Completely saponified polyvinyl alcohols | (B-2) Partially saponified polyvinyl alcohols | Weight ratio (A)/(B-1)/(B-2) | Solvent | (A) + (B) total concentration (%) | pH adjuster | pH | Amount of polymer scale (g/m²) After 1st batch | Amount of polymer scale (g/m²) After 3rd batch | L value | No. of fish-eye |
|---|---|---|---|---|---|---|---|---|---|---|---|---|
| 140* | Shikonin | — | — | 100/0/0 | Water/Methanol (50/50) | 0.5 | NaOH | 9.0 | 320 | — | 71.0 | 35 |
| 141 | Shikonin | Ia, a = 99.0 | — | 100/0/100 | Water/Methanol (50/50) | 0.5 | NaOH | 9.0 | 2 | 40 | 72.0 | 5 |
| 142 | Shikonin | — | — | 100/100/0 | Water/Methanol (50/50) | 0.5 | NaOH | 9.0 | 32 | 72.0 | 5 | |
| 143 | Shikonin | Ia a = 99.0 | IIa, s = 88 | 100/100/100 | Water/Methanol (50/50) | 0.5 | NaOH | 9.0 | 0 | 0 | 72.5 | 3 |
| 144 | Shikonin | Ia a = 99.0 | IIa s = 88 | 100/50/50 | Water/Methanol (50/50) | 0.5 | NaOH | 9.0 | 0 | 0 | 72.5 | 3 |
| 145 | Shikonin | Ia a = 99.0 | IIa s = 88 | 100/200/200 | Water/Methanol (50/50) | 0.5 | NaOH | 9.0 | 0 | 2 | 72.5 | 5 |

TABLE 3-continued

| | | (B) Polyvinyl alcohols* | | | | | | | | |
|---|---|---|---|---|---|---|---|---|---|---|
| | | (B-1) Completely saponified polyvinyl alcohols | (B-2) Partially saponified polyvinyl alcohols | Weight ratio (A)/(B-1)/(B-2) | Solvent | (A) + (B) total concentration (%) | pH adjuster | pH | Amount of polymer scale (g/m²) | L value | No. of fish-eye |
| Exp. No. | (A) Naphtoquinone natural coloring matter | | | | | | | | | | |
| 146 | Shikonin | Ia a = 99.0 | IIa s = 88 | 100/1/200 | Water/Methanol (50/50) | 0.5 | NaOH | 9.0 | 0 | 72.5 | 5 |
| 147 | 2-hydroxy-3-methylnaphthazarin | Ib, s ≅ 99.0 | IIb s = 88 | 100/200/100 | Water/Methanol (80/20) | 0.3 | NH₄OH | 8.5 | 0 | 72.5 | 2 |
| 148 | 2-hydroxynaphthazarin | Ic, s ≅ 99.0 | Ib s = 88 | 100/100/200 | Water/Methanol (80/20) | 0.3 | NH₄OH | 8.5 | 0 | 72.0 | 3 |
| 149 | Acetylshikonin | Ic s ≅ 99.0 | IIc, s = 79 | 100/50/50 | Water/Methanol (80/20) | 0.3 | NH₄OH | 9.5 | 0 | 72.0 | 3 |
| 150 | Naphthazarin | Id, s ≅ 99.0 | IIc s = 79 | 100/30/100 | Water/Methanol (80/20) | 0.3 | NH₄OH | 9.5 | 0 | 72.5 | 2 |
| 151 | 2-methylnaphthazarin | Ia, s *2 99.0 | IIa, s *2 88 | 100/100/100 | Water/Methanol (80/20) | 0.3 | NH₄OH | 9.5 | 1 | 72.5 | 3 |
| 152 | 2-methylnaphthazarin | Ig, s = 96.5 | IId s = 88 | 100/100/100 | Water/Methanol (80/20) | 0.3 | NH₄OH | 9.5 | 8 | 72.5 | 9 |
| 153 | 2,7-dimethylnaphthazarin | Ib, s = 99.0 | IIa s = 88 | 100/100/100 | Water/Methanol (80/20) | 0.3 | H₂SO₄ | 5.0 | 5 | 72.5 | 7 |
| 154 | Teracrylic shikonin | Ia, s *2 99.0 | IIb *2 88 | 100/50/50 | Water/Methanol (80/20) | 0.3 | H₂SO₄ | 5.0 | 4 | 72.5 | 8 |
| 155 | Shikonin | Ia s = 99.0 | IIc, s = 79 | 100/50/200 | Water/Methanol (80/20) | 0.3 | H₂SO₄ | 3.0 | 6 | 72.5 | 8 |
| 156* | C.I. Acid Black 2 | Ia s = 99.0 | IIa, s = 88 | 100/100/100 | Water/Methanol (80/20) | 0.3 | H₂SO₄ | 5.0 | 15 | 67.5 | 8 |
| 157* | C.I. Acid Black 2 | Ia s = 99.0 | IIa s = 88 | 100/100/100 | Water/Methanol (80/20) | 0.3 | NH₄OH | 9.0 | 200 | 67.5 | 30 |

Polymers obtained in some of the experiments above were tested for bulk specific gravity in accordance with Section 3.3 in JIS K 6721. The results are given in Table 4.

TABLE 4

| Experiment No. | Bulk specific gravity (g/cm$^3$) |
| --- | --- |
| 101* | 0.526 |
| 108* | 0.511 |
| 116* | 0.515 |
| 104 | 0.525 |
| 109 | 0.524 |
| 110 | 0.525 |
| 117 | 0.526 |
| 118 | 0.525 |
| 119 | 0.526 |
| 120 | 0.524 |
| 130* | 0.508 |
| 138* | 0.514 |
| 126 | 0.526 |
| 127 | 0.526 |
| 131 | 0.522 |
| 132 | 0.525 |
| 134 | 0.525 |
| 135 | 0.522 |
| 151* | 0.518 |
| 157* | 0.513 |
| 143 | 0.524 |
| 144 | 0.526 |
| 145 | 0.526 |
| 150 | 0.525 |
| 153 | 0.523 |

We claim:

1. A polymer scale preventive agent for use in polymerization of vinyl chloride monomer or a monomer mixture containing vinyl chloride monomer as a major component, comprising:
   (A) a naphthoquinone natural dye selected from the group consisting of naphthazarines and
   (B) a polyvinyl alcohol with a saponification degree of at least 50 mol % wherein the component (B) essentially consists of (B-1) a polyvinyl alcohol with a saponification degree of at least 95 mol % and (B-2) a polyvinyl alcohol with a saponification degree of at least 70 mol % but not more than 95 mol %, wherein the weight ratio of component (B-1)/component (B-2) is in the range of 1/50 to 50/1.

2. The agent of claim 1, wherein the component (B) comprises a polyvinyl alcohol with a saponification degree of at least 95 mol %.

3. The agent of claim 1, wherein the polyvinyl alcohol of the component (B) has a polymerization degree of 300 to 8,000.

4. The agent of claim 1, wherein the component (B) is contained in an amount of 0.1 to 10,000 parts by weight per 100 parts by weight of the component (A).

5. The agent of claim 1 which further comprises a solvent and is in a state of a solution or a dispersion.

6. The agent of claim 5, wherein the total concentration of the components (A) and (B) is in the range of 0.001 to 20% by weight.

7. The agent of claim 1, wherein component (A) comprises at least one compound selected from the group consisting of naphthazarin, 2,3-dihydroxynaphthazarin, 2-methylnaphthazarin, 2-hydroxynaphthazarin, 2-hydroxy-3-methylnaphthazarin, 2-hydroxy-3-ethylnapthazarin, 2-hydroxy-3-acetylnaphthazarin and 2,7-dimethylnaphthazarin.

* * * * *